J. MESSENGER.
ORNAMENTAL INSECT.
APPLICATION FILED MAR. 26, 1921.
1,408,017.
Patented Feb. 28, 1922.
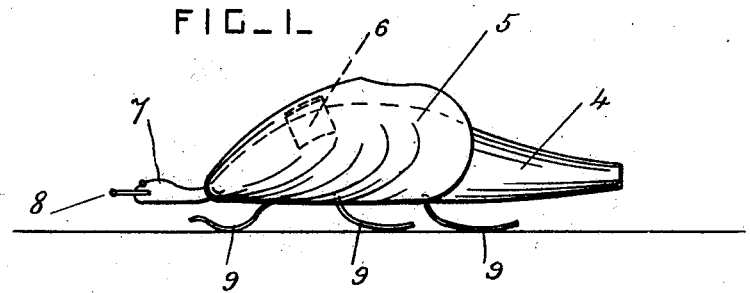
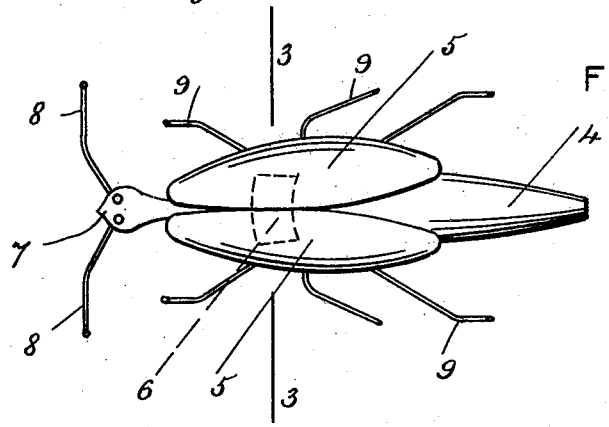
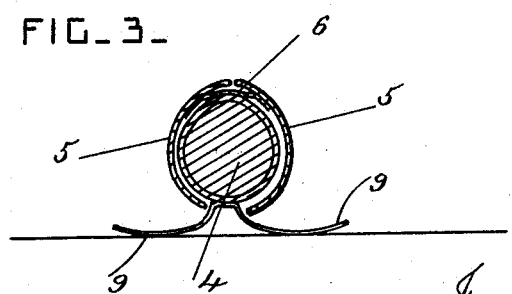
Inventor
Jane Messenger,
by Herbert W. T. Jenner,
Attorney.

UNITED STATES PATENT OFFICE.

JANE MESSENGER, OF PACIFIC GROVE, CALIFORNIA.

ORNAMENTAL INSECT.

1,408,017.

Specification of Letters Patent. Patented Feb. 28, 1922.

Application filed March 26, 1921. Serial No. 455,786.

*To all whom it may concern:*

Be it known that I, JANE MESSENGER, a subject of Great Britain, residing at Pacific Grove, in the county of Monterey and State of California, have invented certain new and useful Improvements in Ornamental Insects, of which the following is a specification.

This invention relates to ornamental forms and more particularly to insect forms provided with wing cases; and it consists in the novel construction and combination of the parts which form the artificial insect as hereinafter fully described and claimed.

In the drawings, Figure 1 is a side view of an ornamental insect constructed according to this invention. Fig. 2 is a plan view of the same. Fig. 3 is a cross-section taken on the line 3—3 in Fig. 2.

The abdomen 4 of the insect is formed of any approved textile material, stuffed with cotton or other similar substance to hold it in shape. The thorax of the insect is covered with the shells 5 of a bivalve, such as mussel shells, or other similar bivalve having two similar shells. These shells are ornamental, and are of a shape to simulate the wing cases of an insect. The usual joint between the shells is replaced by a piece of flexible material 6 which is secured at its middle part to the body of the insect and at its sides to the two shells, so that the shells inclose the thorax without being rigidly secured to it.

The head 7 of the insect is formed of textile material stretched over a wire frame, and provided with antennæ 8 of wire covered with cotton or silk. The legs 9 of the insect are also formed of wire covered with cotton. Six legs are preferably provided, and they are bent to suitable shape to support the body and its wing cases.

This ornamental insect is used as a decoration for Christmas trees, as a souvenir, and it may be used for personal wear, if desired.

What I claim is:

1. An ornamental insect having its body portion provided with wing cases formed of the two similar shells of a bivalve, said shells being secured over the body portion adjacent to the head of the insect with their hinged parts uppermost and their lower edges separated to afford a passage for the legs of the insect.

2. An ornamental insect having its body portion provided with wing cases formed of the two similar shells of a bivalve, said shells being connected together and to the body portion by a flexible member secured to the shells where the natural hinge is located.

In testimony whereof I affix my signature.

JANE MESSENGER.